(12) United States Patent
Lanza et al.

(10) Patent No.: US 6,737,652 B2
(45) Date of Patent: May 18, 2004

(54) CODED APERTURE IMAGING

(75) Inventors: Richard C. Lanza, Brookline, MA (US); Roberto Accorsi, St. Davids, PA (US); Francesca Gasparini, Milan (IT)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/966,357

(22) Filed: Sep. 28, 2001

(65) Prior Publication Data
US 2002/0075990 A1 Jun. 20, 2002

Related U.S. Application Data
(60) Provisional application No. 60/236,878, filed on Sep. 29, 2000.

(51) Int. Cl.$^7$ ............................................. G01T 1/164
(52) U.S. Cl. ............................ 250/363.06; 250/237 R
(58) Field of Search .......................... 250/363.06, 33.61, 250/237 R

(56) References Cited

U.S. PATENT DOCUMENTS

| | | | |
|---|---|---|---|
| 4,075,483 A | | 2/1978 | Tancrell et al. |
| 5,606,165 A | * | 2/1997 | Chiou et al. ............ 250/363.06 |
| 5,930,314 A | | 7/1999 | Lanza ........................ 376/159 |
| 6,205,195 B1 | | 3/2001 | Lanza ........................ 376/157 |

FOREIGN PATENT DOCUMENTS

WO    WO 97/26557    7/1997

OTHER PUBLICATIONS

Koral, K.F. and Rogers, Leslie W., "Application of ART to Time–coded Emission Tomography," *Physics in Medicine and Biology*, 24(5): 879–894 (1979).

Charalambous, P.M., et al., "Aberrations in gamma–ray coded aperture imaging," *Applied Optics*, 23(22): 4118–4123 (1984).

Fenimore, E. E., "Coded aperture imaging: predicted performance of uniformly redundant arrays," *Applied Optics*, 17(22): 3562–3570 (1978).

(List continued on next page.)

*Primary Examiner*—Thanh X. Luu
*Assistant Examiner*—Stephen Yam
(74) *Attorney, Agent, or Firm*—Hamilton, Brook, Smith & Reynolds, P.C.

(57) ABSTRACT

Improved systems and methods for coded aperture imaging of radiation-emitting sources. According to one aspect, the present invention is directed to reducing and/or eliminating the artifacts that are inherent in previous near field coded aperture imaging systems such that the improved sensitivity and resolution of these systems can be practically utilized.

A system and method of the present invention utilizes two projections of radiation from an object, the first through a first coded aperture mask pattern, and the second through a second coded aperture mask pattern, where a decoding array associated with the second mask pattern is the negative of a decoding array associated with the first mask pattern. Data from both projections is combined to produce a reconstructed object image that is substantially free of near-field artifacts.

The present invention additionally relates to further improvements in the sensitivity and spatial resolution of coded aperture imaging applications. More particularly, the present invention relates to improvements in the design and fabrication of coded aperture masks for use in coded aperture imaging devices. Improvements can be made to the resolution, for instance, by selecting smaller pixel sizes for the opaque and transparent elements of the coded aperture mask. Also, it is possible to improve the signal-to-noise ratio for near-field applications by selecting an appropriate thickness for the mask. The signal-to-noise ratio may be further improved by selecting the appropriate mask pattern based on the particular characteristics of the near-field imaging problem at hand.

32 Claims, 10 Drawing Sheets

OTHER PUBLICATIONS

Gottesman, S.R., and Schneid, E.J., "PNP—A new class of coded aperture arrays," *IEEE Transactions on Nuclear Science*, NS–33: 745–749 (1986).

Fleming, J. S., and Goddard, B.A., "An evaluation of techniques for stationary coded aperture three–dimensional imaging in nuclear medicine," *Nuclear Instruments and Methods in Physics Research*, 221: 242–246 (1984).

Lanza, R. C., et al., "CAFNA, Coded Aperture Fast Neuron Analysis: application to contraband and explosive detection," in Third International Topical Meeting on Nuclear Applications of Accelerator Technology, *ANS Conference Proceedings*, LaGrange Park: American Nuclear Society: 147–154 (1999).

Durrant, P.T., et al., "The application of pinhole and coded aperture imaging in the nuclear environment," *Nuclear Instruments and Methods in Physics Research*, A 422:667–671 (1999).

Liu, Y. H., et al. "A novel geometry for SPECT imaging associated with the EM–type blind deconvolution method," *IEEE Transactions on Nuclear Science*, NS–45 (4): 2095–2101 (1998).

Rogers, Leslie W., et al., "Coded–Aperture imaging of the heart," *Journal of Nuclear Medicine*, 21 (4): 371–378 (1980).

Koral, Kenneth F., et al., "Thyroid scintigraphy with time–coded aperture," *Journal of Nuclear Medicine*, 20 (4) : 345–349 (1979).

Gottesman, S.R., and Fenimore, E.E., "New family of binary arrays for coded aperture imaging," *Applied Optics*, 28 (20): 4344–4352 (1989).

Gozani, T., "Principles of Nuclear–Based Explosive Detection Systems," in *Proceedings of the First International Symposium on Explosive Detection Technology*, edited by S. Khan ed., NJ: Fed. Aviation Admin., U.S. Dept. of Transportation, FAA Technical Center: 27–55 (1992).

Koral, Kenneth F., et al., "Digital Tomographic Imaging with Time–Modulated Pseudorandom Coded Aperture and Anger Camera," *Journal of Nuclear Medicine*, 16 (5): 402–413 (1974).

Cannon, T.M., and Fenimore, E.E., "Coded aperture imaging: many holes make light work," *Optical Engineering*, 19:283–289 (1980).

Jayanthi, U.B., and Braga, J., "Physical implementation of an antimask in URA based coded mask systems," *Nuclear Instruments and Methods in Physics Research*, A310: 685–689 (1991).

McConnell, M.L., et al., "A Coded Aperture Gamma Ray Telescope," *IEEE Transactions on Nuclear Science*, NS–29 (1): 155–159 (1982).

Dunphy, Philip P., et al., "A Balloon–Borne Coded Aperture Telescope for Low–Energy Gamma–Ray Astronomy," *Nuclear Instruments and Methods in Phys. Research*, A274: 362–379 (1989).

Jupp, I.D., et al., "A Comparison of the Performance of Different Gamma–ray Imaging Systems," Paper presented at the Nuclear Science Symposium, IEEE (1997).

Zhang, L., et al., "High energy 3–D nuclear medicine imaging using coded apertures with a conventional gamma camera," Conference paper presented at the IEEE Nuclear Science Symposium Conference Record, Toronto, Ont., Canada, (1998, Nov.).(Abstract).

\* cited by examiner

Ô = G ⊗ P $$FoV = \frac{D}{m-1} \frac{m}{m-1} d$$

$$FoV = \frac{D}{m-1}$$

MURA 11 x 11

12.5%

MURA 23 x 23

50%

$\rho$

CODED APERTURE IMAGING

RELATED APPLICATION

This application claims the benefit of U.S. Provisional Application No. 60/236,878, filed on Sep. 29, 2000, the entire teachings of which are incorporated herein by reference.

GOVERNMENT SUPPORT

The invention was supported, in whole or in part, by grant 93-G053 from the Federal Aviation Administration (FAA) and under contract DAAD07-98-C-0117 from the Office of National Drug Control Policy (ONDCP). The Government has certain rights in the invention.

BACKGROUND OF THE INVENTION

Coded aperture imaging has been proposed in the past as a means for improving the spatial resolution, sensitivity, and signal-to-noise ratio (SNR) of images formed by x-ray or gamma ray radiation. For many imaging applications, coded aperture cameras have proven advantageous relative to other candidate systems, including the single pinhole camera and multihole collimator systems. In contrast to these other systems, for instance, the coded aperture camera is characterized by high sensitivity, while simultaneously achieving exceptional spatial resolution in the reconstructed image.

In contrast to the single pinhole camera, coded aperture systems utilize multiple, specially-arranged pinholes to increase the overall photon transmission, and hence the sensitivity, of the imaging camera. In operation, radiation from the object to be imaged is projected through the coded aperture mask and onto a position-sensitive detector. The coded aperture mask contains a number of discrete, specially arranged elements that are either opaque or transparent to the incident photons. The raw signal from the detector does not reflect a directly recognizable image, but instead represents the signal from the object that has been modulated or encoded by the particular aperture pattern. This recorded signal can then be digitally or optically processed to extract a reconstructed image of the object.

SUMMARY OF THE INVENTION

Most commonly, coded aperture imaging techniques are employed in the field of astronomy. For instance, coded aperture techniques have been used for many years in the imaging of distant x- or gamma-ray astronomical sources. These applications are classic "far field" (i.e. small object angle) imaging applications, where, under the proper conditions, conventional deconvolution techniques may be employed to produce ideal images of the source.

However, for near field applications, including nuclear medicine, molecular imaging, materials analysis, and contraband detection, among others, these same deconvolution methods do not produce ideal object images. Rather, in near field imaging applications, the reconstructed object images are corrupted by artifacts, including unsightly lines and/or bows through the object image. The presence of these artifacts render coded aperture systems far less attractive for near field imaging applications, particularly for applications such as nuclear medicine imaging, which rely heavily on visual inspection of the reconstructed object image. In the particular case of nuclear medicine imaging, for example, the presence of these artifacts may render it difficult or impossible to distinguish actual objects from artifacts in the reconstructed images, and may be a prohibitive factor weighing against the widespread adoption of coded aperture techniques.

The present invention relates to improved systems and methods for near-field coded aperture imaging of radiation-emitting sources. According to one aspect, the present invention is directed to reducing and/or eliminating the artifacts that are inherent in previous near field coded aperture imaging systems such that the improved sensitivity and resolution of these systems can be practically utilized.

In one aspect, the present invention is based upon the recognition that near field artifacts result primarily from the physical process of projecting radiation from the object through the coded aperture and onto the detector. It has heretofore been assumed that, for coded aperture arrays having perfect cross-correlation properties, the projected image obtained at the detector is the convolution of the object with the aperture mask. In fact, however, this projection contains a non-linear $\cos^3(\theta)$ term affecting the image. For far field applications, including astronomical applications where the object-to-detector distance is many orders of magnitude greater than the detector size, this $\cos^3(\theta)$ term can be approximated as equal to one, and the projected image on the detector is the straightforward convolution of the object and aperture mask.

For the near field applications of the present invention, however, this $\cos^3(\theta)$ term does not approximate as one, and therefore it gives rise to visible artifacts which corrupt the reconstructed object image. The present invention relates in one aspect to systems and methods for reducing or removing these artifacts from the reconstructed image. More specifically, the invention comprises providing a radiation-emitting object within the field of view of a coded aperture camera; generating a signal corresponding to a first image of radiation from the object projected through a first coded aperture mask pattern; generating a signal corresponding to a second image of radiation from the object projected through a second coded aperture mask pattern, where the second pattern is the "negative" of the first; and then processing the combined data from these projections to obtain a reconstructed image of the object.

In the context of the present invention, the second mask pattern is related to the first mask pattern because the second pattern is the one associated to the negative of the decoding pattern associated with the first physical mask pattern. For each coded aperture mask pattern, there is an associated decoding function, G, that is used to decode the recorded image and produce the source reconstruction. One may change the sign of G to produce −G, i.e. the negative of the decoding array. The second projection is then taken with the physical mask associated with −G, which according to this invention is referred to as the "negative" mask. As near-field artifact effects are dependent on G and −G, when the data sets from both projections are combined, the near-field artifacts cancel from the reconstructed image.

Some mask families, including the URA and m-sequence families, have the particular property that the "negative" mask may be produced by simply interchanging the position of the opaque and transparent elements of the physical mask. This is because, for these families, the array, A, and decoding array, G, are identical. Thus, when signs change for the transparent and opaque elements of the decoding array, the elements simply interchange with one another. Also, because the array and decoding array are identical, the elements similarly change for the associated "negative" physical mask. The resultant mask, with the elements interchanged, is sometimes referred to as the "antimask" of the first mask.

For some near-field applications, two physical masks may be used to provide the two masks: the first being the mask pattern, and the second being the negative mask pattern. Depending on the particular mask family chosen, the second mask could be the antimask of the first. In this example, the physical masks can be interchanged between projections, either by operator intervention, or by an automated process.

In other cases, depending on the particular mask pattern used, a single physical mask may comprise both the mask and its negative mask. For some mask families, for instance, the negative of the original mask pattern (i.e. the mask associated with −G) may be obtained by simply rotating the physical mask by a given angle. For certain antisymmetric mask patterns, including a No-Two-Holes-Touching MURA pattern, for instance, a first mask pattern will produce its negative pattern when rotated by 90°.

The use of a mask and its antimask has been reported previously in connection with far-field astronomical applications for the much different goal of reducing non-uniform background and compensating for systematic irregularities. For instance, in the context of a balloon or satellite-borne gamma-ray telescope, the mask-antimask technique may be useful to "average out" irregularities that may develop in the detector apparatus, particularly given the practical difficulties in accessing and actively maintaining the equipment.

On the other hand, near field coded aperture imaging applications uniquely suffer from the problem of near field artifacts, a problem which may be minimized through the use of a mask and its negative, which may, in certain instances, include the use of the mask/antimask pair. Generally, it has been found that when the data sets of an image taken through a mask and its negative mask are combined, the object images reinforce, while the near-field artifacts cancel. Thus, the mask/negative mask technique may be easily and efficiently employed in near field problems to produce robust images that are substantially free from artifacts caused by near-field geometry. The present invention is particularly advantageous in that it is implemented primarily in hardware, it does not rely on heavy computation and it does not require any significant extension of the time needed to produce an image.

In the context of the present invention, near-field imaging comprises coded aperture imaging applications wherein the projected image obtained at the detector is not the straightforward convolution of the object with the aperture mask, but is additionally affected by a $\cos^3(\theta)$ term that contributes to the reconstructed image in the form of visible artifacts. For many, but not necessarily all, near field applications, the object is less than about 10 meters from the detector. For other applications, including nuclear medicine imaging, where the goal is often to collect the data as close to the source as possible, the object-to-detector distance can be less than about 1 meter.

The present invention additionally relates to further improvements in the sensitivity and spatial resolution of coded aperture imaging applications. More particularly, the present invention relates to improvements in the design and fabrication of coded aperture masks for use in coded aperture imaging devices. Improvements can be made to the resolution, for instance, by selecting smaller pixel sizes for the opaque and transparent elements of the coded aperture mask. Also, it is possible to improve the signal-to-noise ratio for near-field applications by selecting an appropriate thickness for the mask. The signal-to-noise ratio may be further improved by selecting the appropriate mask pattern based on the particular characteristics of the near-field imaging problem at hand.

BRIEF DESCRIPTION OF THE DRAWINGS

FIG. 3 is a process diagram illustrating coded aperture imaging as a projection process and an object reconstruction process;

Figure 1:
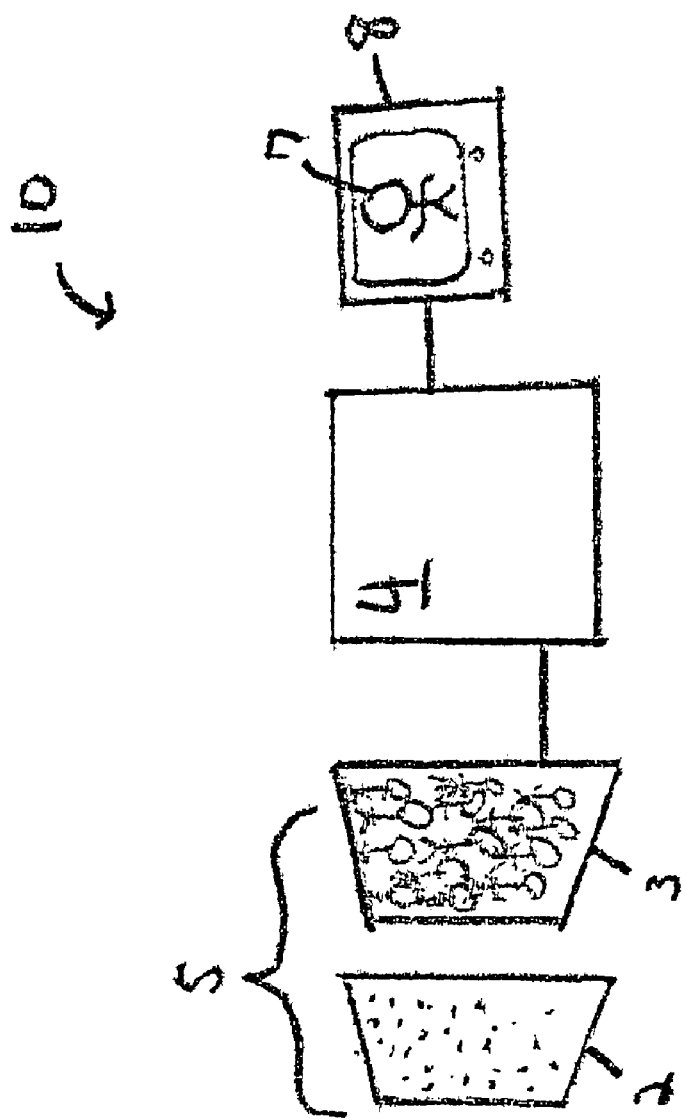
FIG. 1 is a schematic view of a coded aperture imaging system according to the present invention.
Figure 1:
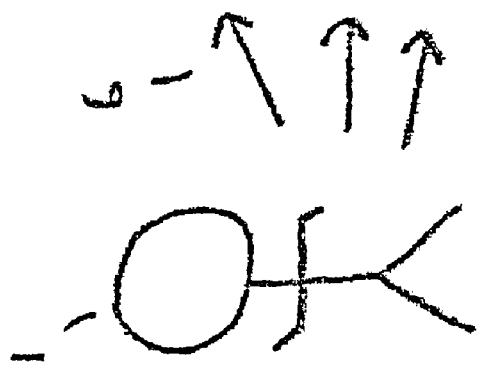

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

In FIG. 1, a system 10 for imaging an object according to the present invention is illustrated, the system comprising a coded aperture 2, a detector 3, and a data processor 4. The coded aperture 2 and detector 3 define an imaging camera 5 having a predetermined field of view (FoV). In operation, an object 1 or a portion of an object to be imaged is positioned within the FoV of the imaging camera 5, where the camera is at a selected distance from the object. Alternatively, the object can remain stationary, and the camera can be positioned such that the object or portion of the object of interest is within the FoV of the camera.

Figure 2A:
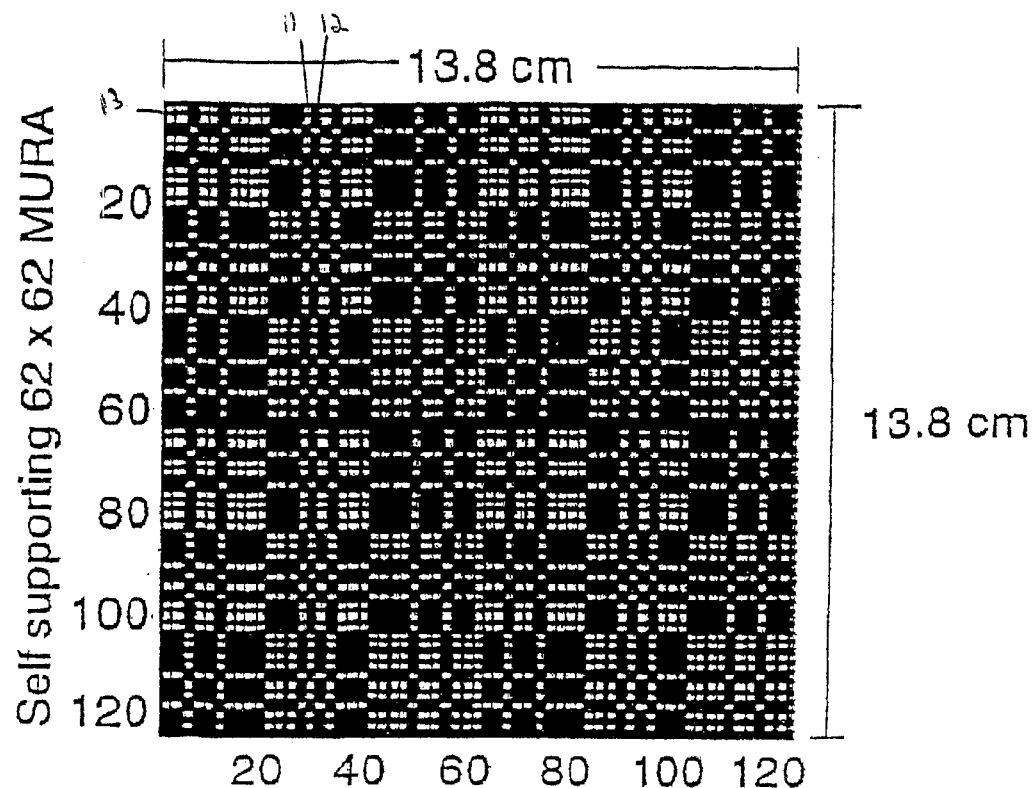
FIG. 2A is an illustration of a coded aperture mask.

The object emits radiation 6, such as, but not limited to, x-ray and/or γ-ray radiation, that is modulated by the coded aperture 2 and impinges upon the detector 3. As illustrated in FIG. 2A, the coded aperture generally comprises open transparent regions 11 and closed regions 12 that are substantially opaque to radiation that is emitted by the object.

If the object is extended, it can generally be treated as comprising multiple point sources, each of which emits radiation. Each of these point-sources casts a particular shift of the coded aperture pattern on the detector 3. Thus, many different shifts, corresponding to the different point sources comprising the radiation emitting object, are superimposed on the detector. The detector 3 provides detection signals corresponding to the energy and pattern of the emitted radiation, and the processor 4 can subsequently characterize the object 1 based upon the detection signals. According to one aspect, the processor 4 can characterize the object by reconstructing a visible image 7 of the object. In this embodiment, the imaging system additionally comprises a display 8 for illustrating the reconstructed object image.

The detector 3 generally comprises a position sensitive detector for recording the transmitted emission signals. A single detector or a line detector can be used to record the spatial distribution of the transmitted emission signals by moving through the entire shadow-casting area within a plane. Preferably, however, the detector comprises a two-dimensional detector array, where the detection plane elements correspond to either a defined region of a continuous detector, or individual detector units spanning the entire area in which the coded aperture casts a shadow. Conventional detector arrays, such as an Anger camera, including a Siemens E-Cam medical gamma camera, may be employed.

One suitable detector arrangement, for instance, is to employ a scintillating material in conjunction with photomultipliers. Useful scintillators include sodium iodide, cesium iodide, gadolinium oxyorthosilicate (GSO), bismuth germanate (BSO), and lutethium oxyorthosilicate (LSO). The scintillators can be constructed as discrete elements or as a single large crystalline sheet. An array of photomultipliers is typically used in conjunction with the scintillator material to accurately record the incident radiation, including its energy and position. Other detectors could include noble gas ionization chambers or solid state materials such as high purity germanium, cadmium zinc telluride (CZT), or cadmium telluride.

The data processor 5, which can be a programmable computer, receives signals from the detector 3 corresponding to the detected radiation signals, and is programmed to characterize the object, including reconstructing an image of the object, based upon the transmitted radiation and the configuration of the coded aperture.

The apertures can be in any shape, including polygons, circles, rings, or a combination of these shapes. Generally, the aperture shape is the same as the cross-sectional shape of the detector elements.

In certain embodiments, it may be advantageous to obtain multiple exposures of the object through one or more coded aperture masks. As described in further detail below, the problem of near-field artifacts may be greatly reduced where the coded aperture camera 5 obtains at least two images using different coded aperture arrays. More specifically, a first mask pattern can be used to obtain a first recorded image, and a second mask pattern that is the "negative," (and, in some cases, the "antimask") of the first can be used to obtain a second recorded image. The second mask pattern is called the negative of the first because the decoding array, $G_2$, associated with the second mask pattern, is the negative of the decoding array associated with the first mask pattern, $G_1$. In other words, $-G_2=G_1$. The coded aperture can then take two pictures of the object, one through the mask and the other through its negative mask, and the data processor can add the two data sets to eliminate near-field artifacts that would otherwise corrupt the reconstructed image.

In certain embodiments, a single physical mask can serve as both the mask and its negative mask. For instance, depending on the axis of symmetry of the mask pattern of the coded aperture, a single mask may comprise a first mask pattern, and then the second, or "negative" of the first pattern when it is rotated about its center by a certain angle. Some mask patterns with an anti-symmetric axis of symmetry, for example, can be used as both the mask, and, when rotated by 90°, the negative mask.

Figure 2B:
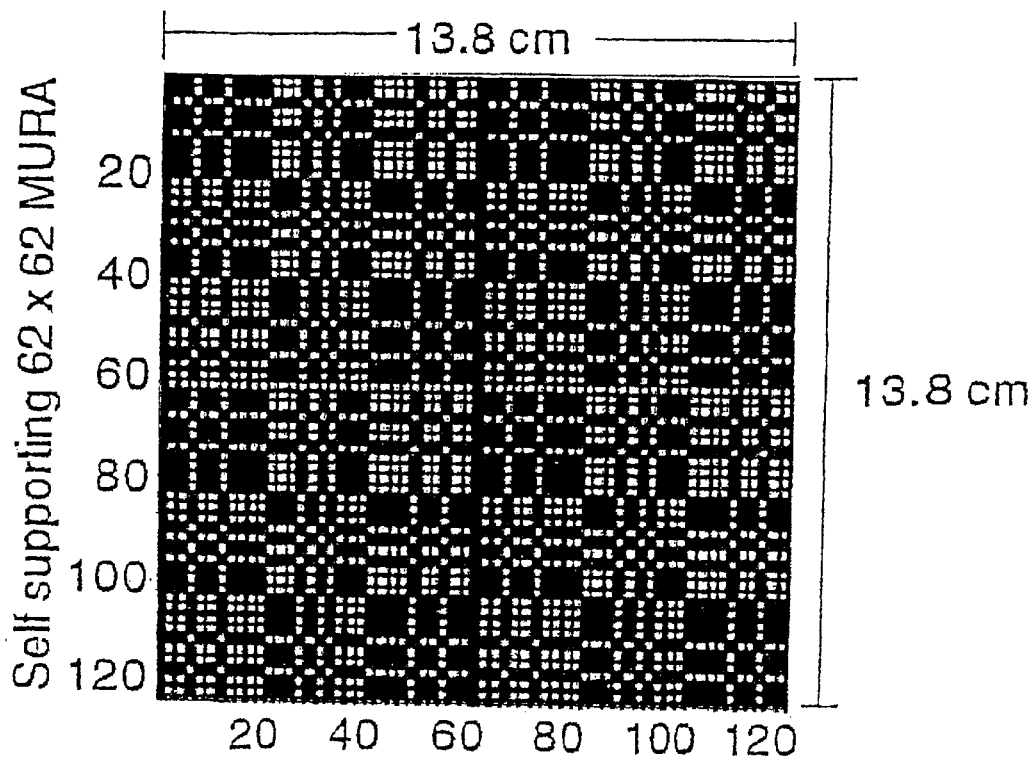
FIG. 2B is an illustration of a coded aperture mask that is the negative of the mask of FIG. 2A.

Two views of a coded aperture mask having an antisymmetric axis of symmetry are illustrated in FIGS. 2A and 2B. The mask of FIG. 2A is a 62×62 No-Two-Holes-Touching MURA mask having a particular pattern of open elements 11 and opaque elements 12. The mask is No-Two-Holes-Touching where no open element is directly adjacent to any other open element, and between each row and column of the mask array, there is a row or column of consisting entirely of opaque elements 13. In the "negative" mask, the open elements 11 switch places with the opaque elements 12, and the opaque strips 13 (which have values of zero in the associated decoding array) maintain their former location. Because of the antisymmetric axis of symmetry, this negative mask may be produced by simply rotating the mask of FIG. 2A by 90°. The result is the mask of FIG. 2B, which is the mask corresponding to the negative of the decoding array of the mask of FIG. 2A.

The anti-symmetric mask is particularly efficient, as it does not require the fabrication of an entirely new mask in order to obtain the negative mask. Also, the use of an anti-symmetric mask simplifies the imaging process, as the only change needed to take the two images is to rotate the mask by 90°. This rotation process can be easily automated.

However, there may be cases where two separate masks (i.e. mask and negative mask) are advantageous. For one, not every mask pattern has the desired axis of symmetry to enable the fabrication of an anti-symmetric mask. In cases where two separate masks are employed, the masks will need to be changed between the two exposures. This can be done directly by the operator, or it could be done via an automated process.

Figure 3:
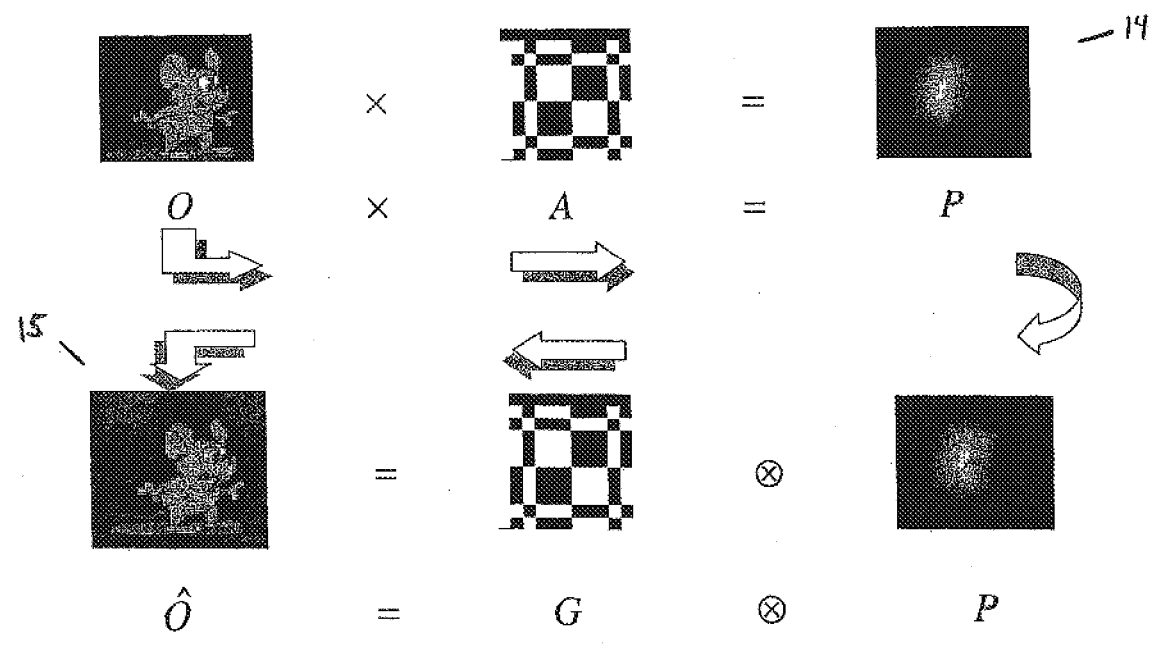

In FIG. 3, coded aperture imaging is illustrated generally as comprising a projection process and an object image reconstruction process. The projection comprises the physical steps of projecting the object through the aperture, to obtain a recorded image on the detector, as shown in step 14. The resulting recorded image, P, represents the correlation between the distribution of the activity on the object plane, O, and the aperture function at the mask plane, A, i.e. P=O×A.

The reconstruction process generally entails decoding the recorded image computationally to produce an object reconstruction image, Ô, as shown in step 15. The reconstructed image, Ô, is produced by taking a periodic correlation between the recorded image, P, and the decoding array, G, (which consists of a data processing function derived essentially from the aperture mask pattern, A), such that Ô=P $\otimes$ G. The decoding array function is associated with the selected mask pattern, A, and can be programmed and stored in a digital computer.

The combined process can thus be summarized by the following relationship:

$$\hat{O} = P \circledx G = (O \times A) \circledx G = O * (A \circledx G) = O * PSF \quad (1)$$

where * is the convolution function, and PSF represents the point spread function (i.e. the image that would be obtained if the object, O, was a point). It will be observed that if the PSF is a δ function, then $\hat{O}=O$, and the reconstruction is perfect. Thus, if one chooses A and G such that $A \circledx G = \delta$, then an ideal result is actually achievable. Several known families of aperture arrays have been found to exhibit this ideal behavior. A number of these families are discussed in R. Accorsi, Ph.D. Thesis in Nuclear Engineering, Massachusetts Institute of Technology, May 2001, (and references therein), the entire contents of which are incorporated herein by reference in the entirety.

Figure 4D:
FIG. 4D is an illustration of a 63×65 m-sequence coded aperture mask pattern.
Figure 4C:
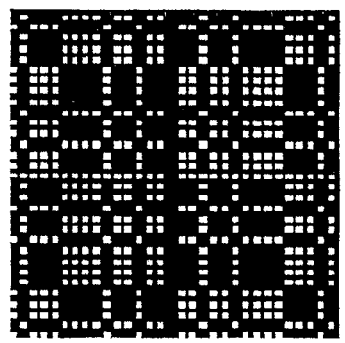
FIG. 4C is an illustration of a 62×62 No-Two-Holes Touching MURA coded aperture mask.
Figure 4B:
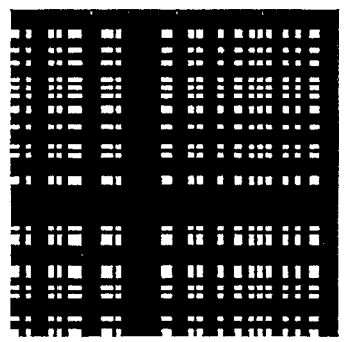
FIG. 4B is an illustration of a 77×77 Product Array coded aperture mask pattern.
Figure 4A:
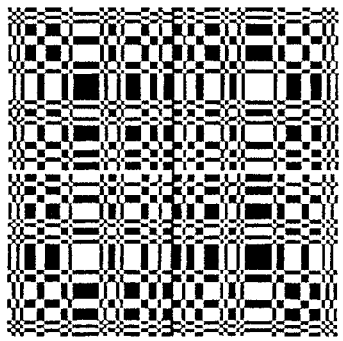
FIG. 4A is an illustration of a 79×79 MURA coded aperture mask pattern.

Representative embodiments from a number of these families are illustrated in FIGS. 4A–4D, including a 79×79 MURA mask (FIG. 4A), a 77×77 Product Array mask (FIG. 4B), a 62×62 No-Two-Holes-Touching MURA mask (FIG. 4C), and an 63×65 M Sequence mask (FIG. 4D). It should be noted for each family characterized by the ideal point spread function behavior described above, all patterns within that family also exhibit this ideal behavior, regardless of their physical dimensions.

In the case of far-field imaging, such as the imaging of high energy x- and γ-ray sources in astronomy, the mathematics of coded aperture imaging demonstrate that apertures with perfect correlation properties provide ideal point spread functions. However, applying the same techniques to near field problems, it has been found that the above deconvolution technique used for far field problems produce images that are affected by artifacts even where magnification is not pushed to achieve high resolution.

In order to overcome the problem of artifacts in near field imaging, origins of these artifacts must be carefully examined. In particular, it has been found that the phenomenon of artifacts in near field images results primarily from the process of projecting the near-field object onto the detector.

Figure 5:
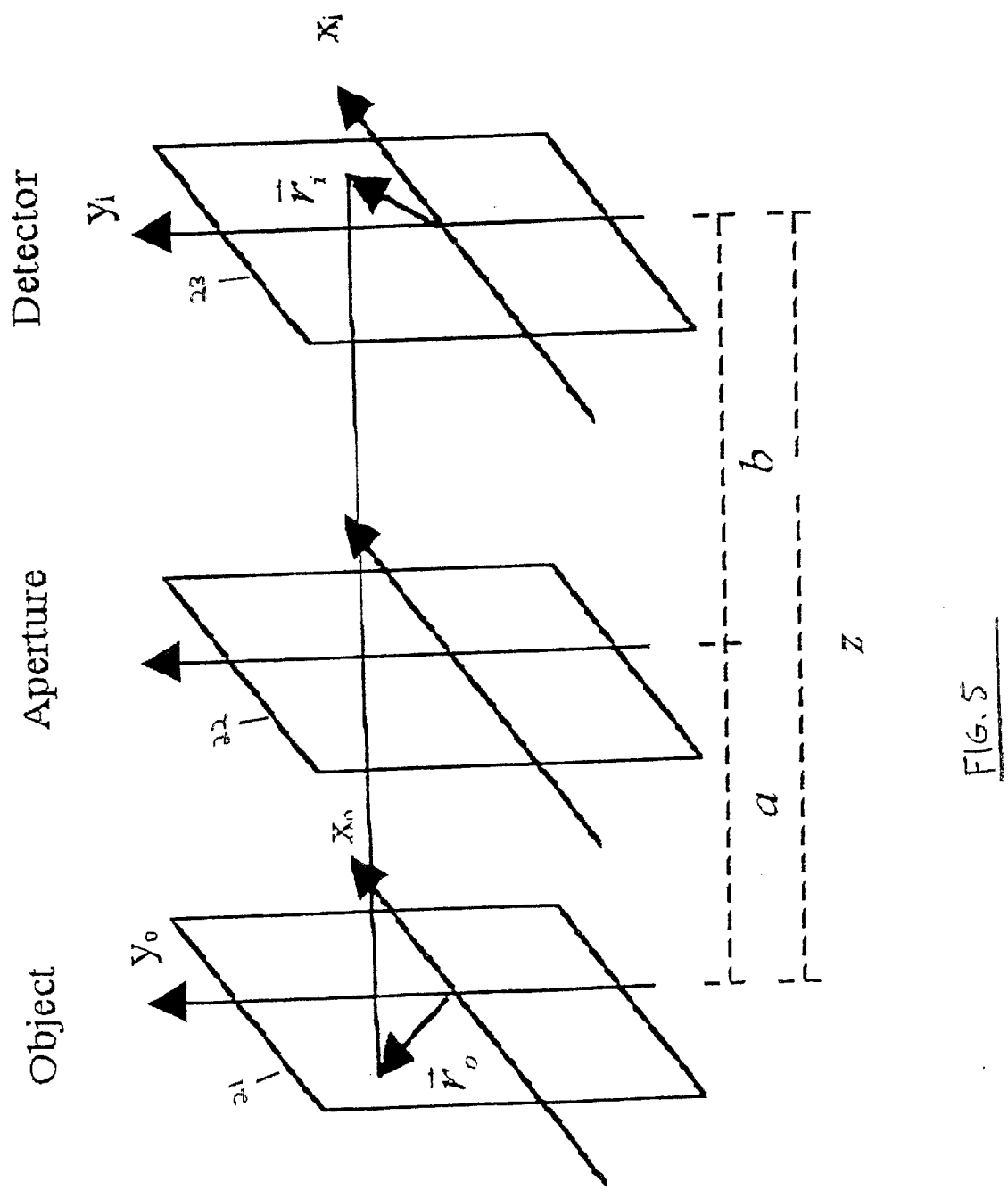
FIG. 5 is a schematic view of the geometry of coded aperture imaging.

FIG. 5 is an illustration of the basic geometry of coded aperture imaging. Shown is an object plane 21, the aperture plane 22, and the detector plane 23. The number of counts recorded at a given detector position, $\vec{r}_i$, in the detector plane is given by:

$$P(\vec{r}_i) \propto \int\!\!\int_{\vec{r}_o} O(\vec{r}_o) A\left[\vec{r}_o + \frac{a}{z}(\vec{r}_i - \vec{r}_o)\right] \cos^3(\theta) d^2\vec{r}_o \quad (2)$$

with $\theta = \text{atg}(|\vec{r}_i - \vec{r}_o|/z)$, O the distribution of the activity on the object plane,
A the aperture function of the mask plane, and all other symbols explained in FIG. 5. If we define:

$$\vec{\xi} = -\frac{b}{a}\vec{r}_o; \quad (3)$$

$$O'(\vec{r}) = O\left(-\frac{a}{b}\vec{r}\right); \quad (4)$$

and $$A'(\vec{r}) = A\left(\frac{a}{z}\vec{r}\right) \quad (5)$$

then Equation 2 can be rewritten as:

$$P(\vec{r}_i) \propto \int\!\!\int_{\vec{\xi}} O'(\vec{\xi}) A'(\vec{r}_i - \vec{r}_o) \cos^3\left[\text{atg}\left(\frac{|\vec{r}_i + \frac{a}{b}\vec{\xi}|}{z}\right)\right] d^2\vec{\xi} \quad (6)$$

O' and A' are, respectively, a rescaled and reflected form of the object, and a rescaled version of the mask pattern: the scaling coefficients are the magnification coefficients relative to the object and mask plane. Note that Equation 6 cannot be written as a correlation due to the near field term $\cos^3(\theta)$. Therefore, the effect of near field is not a modulation of the object by a constant factor $\cos^2(\theta)$, as in far field problems for off-axis sources.

The reconstructed image is obtained from P via correlation with the decoding pattern, G', associated to the mask A:

$$\hat{O} = P \circledx G' \quad (7)$$

where prime indicates that G was scaled according to A'.
It will be apparent that if the object is far from the detector so that $\vec{r}_i \ll z$, we can make the far-field approximation:

$$\cos^3(\theta) \cong 1 \quad (8)$$

and write P as the convolution:

$$P = O'*A' \quad (9)$$

which is equivalent to the correlation of the object (rescaled but not reflected) with the rescaled mask. Using the principles of coded aperture imaging described above, for ideal pairs (A,G), Equation 7 becomes:

$$\hat{O} = (O' \times A') \circledx G' = \Re[O'*(G' \circledx A')] = \Re(O'*\delta) = \Re(O') \quad (10)$$

where $\Re$ is the reflection operator. The reconstructed object is the object itself apart from a rescaling constant. However, if the far-field approximation, $\cos^3(\theta) \cong 1$, does not hold, then Equation 9 does not assume any simplified form and we do not reach this point.

In near field imaging problems, such as nuclear medicine imaging, it is often important to collect data as close to the source as possible. This maximizes the sensitivity of the imaging system, and helps to minimize the dose levels of radioactive material given to the patient. Therefore, $\vec{r}_i$ is often comparable to z and the far-field approximation does not hold.

To understand the problem mathematically, the near-field term in Equation 6 can be expanded in Taylor series to the second order. The result is:

$$\cos^3\left[\text{atg}\left(\frac{|\vec{r}_i + \frac{a}{b}\vec{\xi}|}{z}\right)\right] \cong \cos^3\left(\text{atg}\left(\frac{|\vec{r}_i|}{z}\right)\right) \cdot \left\{1 - \frac{3/z^2}{1 + \frac{|\vec{r}_i|^2}{z^2}}\left[\vec{r}_i \circ \frac{a}{b}\vec{\xi} + \frac{1}{2}\frac{a}{b}|\vec{\xi}|^2\right] - \frac{5/2z^2}{\left(1 + \frac{|\vec{r}_i|^2}{z^2}\right)^2}\left(\vec{r}_i \circ \frac{a}{b}\vec{\xi}\right)^2\right\} \quad (11)$$

This expansion is more accurate the larger the margin by which the condition $$\frac{\frac{a}{b}\vec{\xi}}{\vec{r}_i} = \frac{\vec{r}_o}{\vec{r}_i} < 1 \tag{12}$$

is true. When high resolution is sought, magnification tends to be high, so a/b is generally low. Another way of looking at the same condition is to recognize that $\vec{r}_i$ is a variable spanning the object, and, because of high magnification, if the object fits in the field of view, it is typically much smaller than the detector, and $\vec{r}_i \gg \vec{r}_o$. Thus, the Taylor approximation is generally accurate. Indeed, it has been found that stopping at the second order is sufficient to explain the observed artifacts.

It is possible to predict the occurrences of artifacts resulting from the contributions zero, first, and second order terms of the near-field equation, Equation 11. More importantly, practical and effective systems and methods for reducing observable near-field artifacts in the reconstructed object image have been discovered in accordance with the present invention.

Observing Equation 11, if the expansion is arrested at the zero order, one has:

$$\cos^3\left(atg\left(\frac{|\vec{r}_i + \frac{a}{b}\vec{\xi}|}{z}\right)\right) \cong \cos^3\left(atg\left(\frac{|\vec{r}_i|}{z}\right)\right) \tag{13}$$

which substituted in Eq. 6 gives:

$$P(\vec{r}_i) = \cos^3\left(atg\left(\frac{\vec{r}_i}{z}\right)\right) \int\int_{\vec{\xi}} O'(\vec{\xi})A'(\vec{r}_i - \vec{\xi})d^2\vec{\xi} \tag{14}$$

The near-field effect is thus reduced to a prefactor modulating the image. As this term depends only on the detector coordinate, $\vec{r}_i$, it is relatively straightforward to correct for zero order artifacts exactly. After dividing the projection data, P, by this prefactor, the projection is again a convolution and the far field conditions of Equation 9 again apply.

However, even correcting for the zero order effect, the overall problem of near field artifacts is not eliminated. Thus, it becomes necessary to correct for first and/or second order artifacts.

The first order term is not negligible. From Eq. 11, its expression is:

$$\cos^3\left[atg\left(\frac{|\vec{r}_i + \frac{a}{b}\vec{\xi}|}{z}\right)\right] \cong -\cos^3\left(atg\left(\frac{|\vec{r}_i|}{z}\right)\right)\frac{3/z^2}{\left(1 + \frac{|\vec{r}_i|^2}{z^2}\right)}\left[\vec{r}_i \circ \frac{a}{b}\vec{\xi}\right] \tag{15}$$

Substitution into Equation 6 leads to, after zero order correction:

$$P(\vec{r}_i) \propto \frac{\vec{r}_i}{z^2 + |\vec{r}_i|^2} \circ \int\int_{\vec{\xi}} \vec{\xi}O'(\vec{\xi})A'(\vec{r}_i - \vec{\xi})d^2\vec{\xi} \tag{16}$$

where ∘ is the scalar product.

The integrand is the center of mass of the object "cut" by A' and the convolution gives the result as a function of the shift of A'. Assuming that A' covers uniformly the field of view and that the object is also reasonably uniform, the result is not a strong function of shift, and gives a constant contribution. The result can be approximated by using a constant vector, $\vec{O}'$, which is the center of mass of O'. Substituting in Eq. 9 thus gives:

$$\hat{O} \propto \vec{O}' \circ \int\int_{\vec{\xi}} \frac{\vec{r}_i}{z^2 + |\vec{r}_i|^2} G'(\vec{r}_i + \vec{\eta})d^2\vec{\eta} \tag{17}$$

For near field applications, the fraction in the integral can be substituted with $\vec{r}_i/z^2$ to further reduce to:

$$\hat{O} \propto \vec{O}' \circ \int\int_{\vec{r}_i} \vec{r}_i G(\vec{r}_i + \vec{\eta})d^2\vec{r}_i \tag{18}$$

Figure 6:
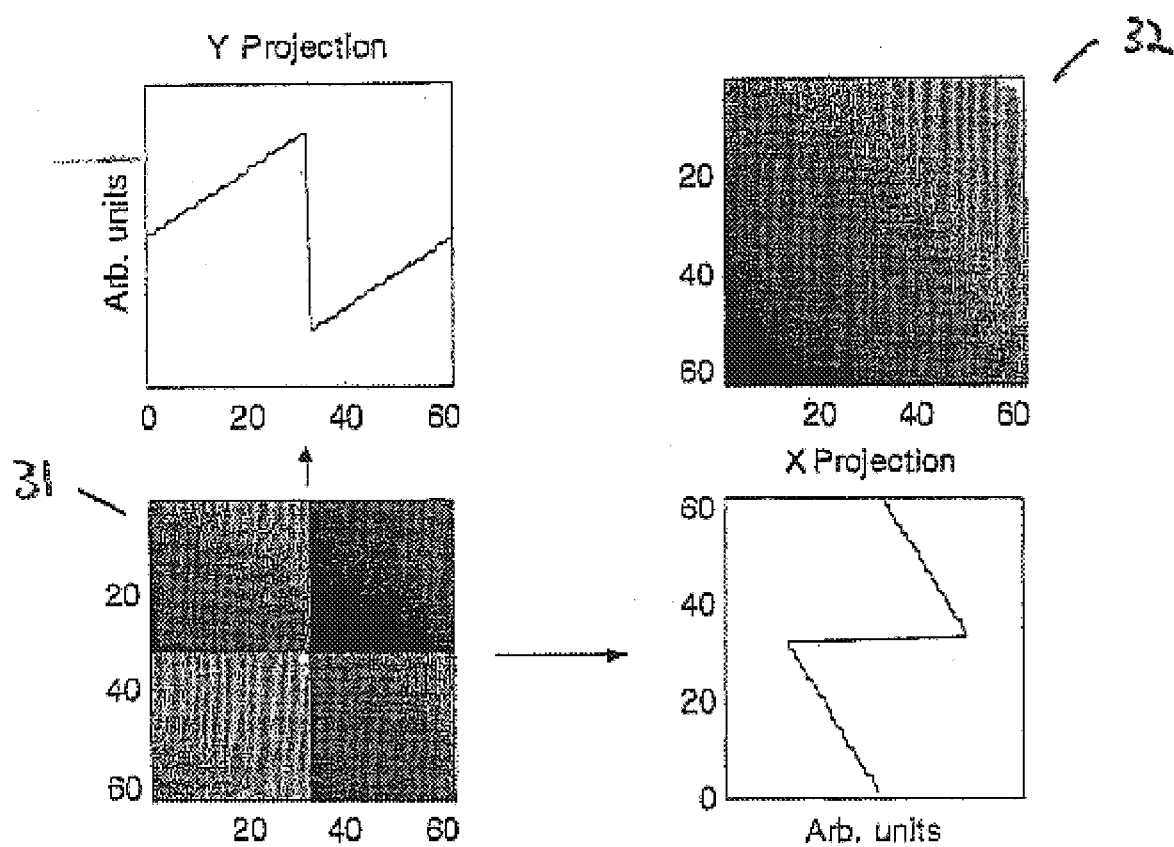
FIG. 6 is an illustration of first order artifacts in a near-field coded aperture imaging application.

The second factor on the right-hand side of Equation 18 is the position of the center of mass of the open positions of G, the decoding pattern, as a function of the decoding position. This quantity depends upon the particular form of G. FIG. 6 illustrates an example of these artifacts for a MURA mask pattern. Generally, as shown in FIG. 6, these artifacts will cause a vertical and/or horizontal line dividing bright and dark areas of the reconstructed image 31. As these artifacts depend on G only, they can be remedied through "pattern centering," that is, shifting the decoding pattern, G, (and thus the mask pattern, A), to move these lines to the borders of the image. For the case of the MURA shown above, this may be accomplished by shifting the decoding and mask patterns by half a period in both the x- and y-directions. The result is a corrected image 32, as shown in FIG. 6. Similar pattern shifting techniques may be used to mitigate first order artifacts in other mask array families, such as an m-sequence array or a product array.

Note in FIG. 6 that the corrected image 32 still contains an artifact resulting from a linear modulation of the intensity making one corner of the image appear brighter than the others. However, this artifact can be eliminated completely with little effort. Returning to Equation 18, the first term on the right hand side of the Equation, $\vec{O}'$, is the Center of Mass of the object. Thus, if object was centered on the field of view, $\vec{O}'$ would be zero, and the term would cancel. Practically speaking, one can eliminate these artifacts by taking a first, raw image to estimate $\vec{O}'$ and then making the necessary corrections before taking a second picture.

Figure 7A:
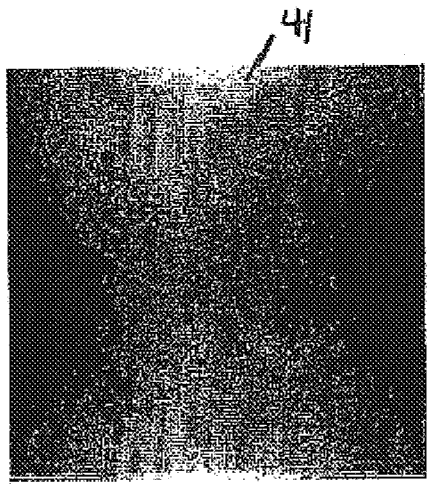
FIG. 7A is an image of a thyroid phantom projected through a mask pattern.
Figure 7B:
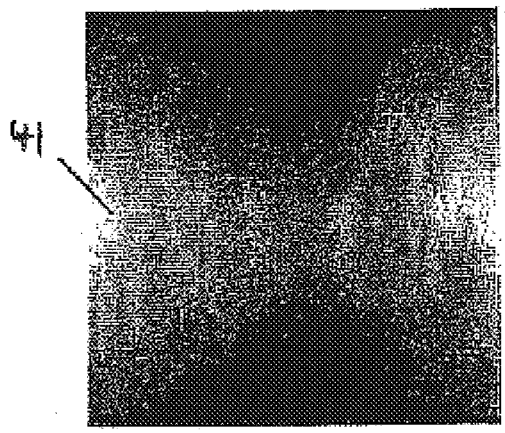
FIG. 7B is an image of a thyroid phantom projected through the negative mask pattern of FIG. 7A.
Figure 7C:
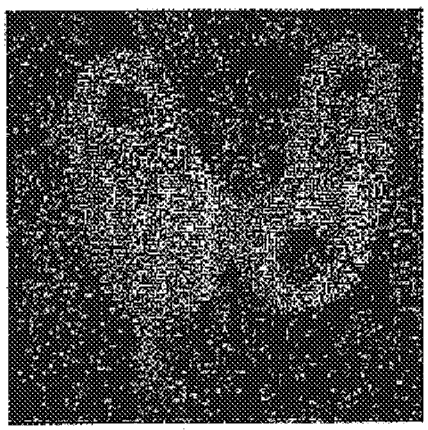
FIG. 7C is an image of a thyroid phantom representing the sum of FIGS. 7A and 7B.
Figure 7D:
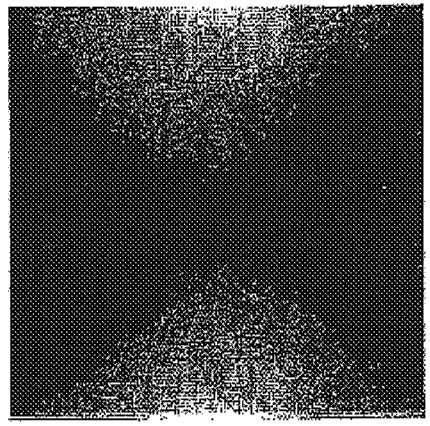
FIG. 7D is an image of a thyroid phantom representing the subtraction of FIGS. 7A and 7B.

We have observed that if the object is centered on the field of view, the first order artifacts disappear, but second order artifacts, normally hidden by the stronger higher-order artifacts, become visible. As illustrated in FIGS. 7A and 7B, these second order artifacts for MURA patterns most commonly appear as semi-circular bows 41 appearing on either side of the reconstructed object image.

The starting point for analyzing the second order artifacts is substituting the second order terms of Equation 11 into Equation 6. For these artifacts, we must consider two terms. The first is:

$$P(\vec{r}_i) \propto \frac{1}{z^2 + |\vec{r}_i|^2} \int\int_{\vec{\xi}} O'(\vec{\xi})A'(\vec{r}_i - \vec{\xi})|\vec{\xi}|^2 d^2\vec{\xi} \tag{19}$$

Here, the integrand is the (second) moment of inertia of O' (cut by A') with respect to an axis perpendicular to the object plane and passing through its center. If the open positions of A' are uniformly distributed (which is the case for the patterns shown in FIGS. 4A–4D), the shift of A' does not modify the result. Upon decoding, the convolution of G with a constant gives a constant, and therefore this term can be neglected.

The other second order term gives:

$$P(\vec{r}_i) \propto \frac{1}{(z^2+|\vec{r}_i|^2)^2} \rho I \int\int_{\vec{\xi}} O'(\vec{\xi})A'(\vec{r}_i-\vec{\xi})(\vec{r}_{i\perp}\circ\vec{\xi})d^2\vec{\xi} \quad (20)$$

where $r_\perp$ is a unit vector. The integrand is the moment of inertia of O' (cut by A'), with respect to the axis on the plane of the object perpendicular to $r_i$. Therefore, it is a function with no dependence on $|\vec{r}_i|$ (assuming, as before, that the open positions of A' are uniformly distributed), and with an angular dependence of period $\pi$. The integrand can be rewritten as $\rho I(r_i)$, where $\rho$ is the open fraction of A and I is the previously discussed moment of O. The contribution to the decoded image is obtained by substituting in Equation 7:

$$\hat{O} \propto \int\int_{\vec{r}_i} \frac{|\vec{r}_i|^2}{(z^2+|\vec{r}_i|^2)^2} \rho I(\vec{r}_i) G'(\vec{r}_i+\vec{\eta}) d^2\vec{r}_i \quad (21)$$

This contribution is stronger the less isotropic the object, (i.e. if the object were a line source, for example). For an isotropic object, however, I is a constant and can come out of the integral. In that case, the artifact will again depend on G only. Equation 21 can thus be rewritten as:

$$\hat{O} \propto \rho I \int\int_{\vec{r}_i} \frac{|\vec{r}_i|^2}{(z^2+|\vec{r}_i|^2)^2} G'(\vec{r}_i+\vec{\eta}) d^2\vec{r}_i \quad (22)$$

As a first approximation, one can ignore the denominator and conclude that second order artifacts have the shape of the moment of inertia of G (with respect to an axis perpendicular to its plane and passing through its center) as a function of shift. Not surprisingly, at second order the second moments of both O and G appear, and unfortunately, neither vanishes. However, for isotropic objects, the artifact depends only on a known quantity (G) and can thus be predicted independently of the object.

As previously discussed, these near-field artifacts can be easily and effectively reduced by recording two images of the object, one with a mask and one with its negative mask, and then adding the two recorded images. This technique relies on the fact that the near-field artifacts described above are dependent primarily on the array-decoding array pair, and not necessarily on the object to be imaged.

More specifically, given a array-decoding array pair (A', G') which the ideal correlation properties discussed above, the pair (1-A', -G') likewise possesses ideal correlation properties (except for a flat pedestal that does not distort the image and can be subtracted). The second mask is the negative of the first where the decoding array associated with the second mask changes signs relative to the decoding array associated with the first pattern. The sign changes cancel in the correlation to reconstruct the image, (see Eq. 10), so that the object images do not change sign. However, the first and second order artifacts predicted by Equations 18 and 22, depend only on G'. Therefore, when an image of the same object is taken with the negative mask, the artifacts change sign while the object image does not. Adding the two images reinforces the object image, and at the same time cancels the artifacts.

This artifact reduction aspect is shown in greater detail in FIGS. 7A–7D, which illustrates the experimental results of two exposures for a thyroid phantom. The mask exposure is shown in FIG. 7A, and the negative mask exposure is shown in FIG. 7B. When the two images are added (FIG. 7C), the artifacts cancel out and the signal is reinforced. If the two images are subtracted (FIG. 7D), the opposite is true, and the artifacts reinforce while the object cancels.

This artifact reduction method has proven effective at reducing not only second order artifacts, but also the first order artifacts previously discussed. In future applications, such as applications requiring a wider field of view, higher order artifacts may additionally be encountered. It is believed, however, that the mask/negative mask technique described herein will be equally effective in reducing these higher order artifacts.

The mathematics of near-field artifacts, and the artifact reduction techniques discussed above are also discussed in Roberto Accorsi & Richard C. Lanza, "Near-Field Artifact Reduction in Planar Coded Aperture Imaging," Applied Optics-IP, Volume 40, Issue 26, 4697–4705, September 2001, the entire contents of which are incorporated herein by reference.

In addition to the near-field artifact reduction techniques described above, still further improvements to the coded aperture imaging systems/methods of the present invention may be realized by optimizing the parameters of the coded aperture mask. The field of view (FoV), resolution ($\lambda$), and signal-to-noise ratio (SNR) are all dependent upon the physical dimensions and characteristics of the given mask. By selecting the appropriate parameters for the mask, the performance of the coded aperture camera can be improved considerably.

For instance, the field of view (FoV) may be increased by adopting a "mosaicked" mask pattern—ie. replicating the mask pattern multiple times around a basic pattern, so that, for all points in the FoV, a shifted cycle of the basic pattern falls completely onto the detector.

Figure 8:
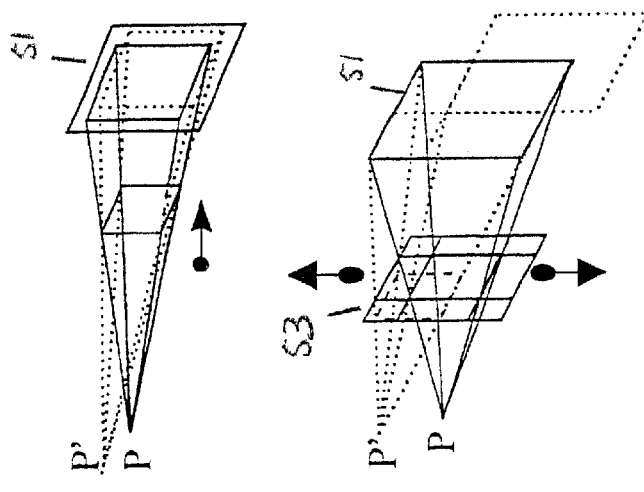
FIG. 8 is a schematic illustration of a point source being imaged with a mosaicked and a non-mosaicked coded aperture mask pattern.
Figure 8:
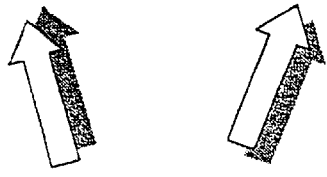
Figure 8:
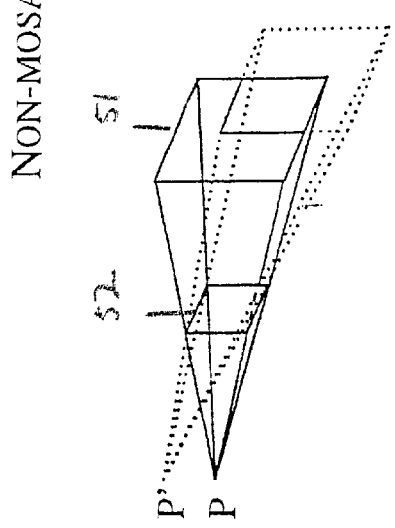

The FoV is important in coded aperture imaging because the ideal point spread function behavior of an array-decoding array pair holds only if, for a given position in the field of view, the detector sees the shadow of a full mask pattern. Otherwise, the encoding is incomplete, and the periodic correlation with G does not produce a $\delta$-like response. This is illustrated in FIG. 8, where a point source, P, is shown centered on the axis of detector 51, and projecting a shadow of the fall mask pattern 52 onto detector 51. A second point source, P', that is not centered on the axis of the detector 51 is also projecting a shadow of the mask 52. However, this shadow does not fall completely on the detector. In this illustration, the field of view of the camera is limited to one point, P, the only point that casts a complete shadow onto the detector.

In this example, the FoV could be improved by moving the mask closer to the detector until the shadows of all points of interest fall completely onto the detector. This solution is not ideal, however, as moving the mask closer to the detector will decrease the magnification, m, and consequently resolution will be lost.

When a mosaicked mask pattern is utilized, however, the FoV may be increased without an attendant loss in resolution. Alternatively, for the same FoV, the resolution can be increased relative to the non-mosaicked mask. The only tradeoff is that a mosaicking the pattern requires a slightly more complicated mask.

An example of a mosaicked mask pattern 53 is also illustrated in FIG. 8. Here, the basic pattern is held at the center of the mask and the copies are arranged around it. In this embodiment, the left half is put to its right, and its right side to its left. This achieves a cyclic repetition as well as the more natural 2×2 lexicographic arrangement. Generally, though, the mosaicking technique cannot be extended to n×n mosaicking where n>2. This would not increase the field of view over the 2×2 design, and would only corrupt the otherwise good field of view for the 2×2 portion of the mask.

Another important parameter of the mask pattern is the mask pixel size, mp, which can be selected to boost the resolution of the coded aperture imaging system. For applications where the FoV and detector size are restricted or fixed, the magnification factor, m, is limited. Thus, one cannot rely indefinitely on the magnification to achieve the desired resolution. However, the resolution can still be improved by reducing the mask pixel size, mp, because the resolution may be defined as:

$$\lambda = mp\left(\frac{m}{m-1}\right) \quad (23)$$

Thus, reducing the mask pixel size will reduce (and, under this definition, improve) the resolution.

There is, however, a limit to how small the mask pixel size can be made. Two factors which should be considered in attempting to optimize the resolution by reducing the mask pixel size include the detector pixel size and the mask thickness. Of these two, the most stringent restriction is set by the detector pixel size, dp, which is dependent not on the mask, but on the detector.

Consider that, for a given field of view, the higher the number of mask pixels (npm), the better the resolution, where:

$$FoV = npm \cdot \lambda \quad (24)$$

The limit on the npm is given by the product of npd, the number of detector pixels, and $\alpha$, a sampling parameter. We have shown that the intensity of a point source is reconstructed independently of its position for any $\alpha \geq 2$. Since:

$$npd = \alpha \cdot npm \quad (25)$$

then:

$$FoV = \frac{npd}{\alpha}\lambda \quad (26)$$

which shows that for a given resolution, higher values of $\alpha$ lead to a smaller field of view, or, for a given field of view, a worse resolution. Consequently, $\alpha$ is preferably set to 2.

The maximum value of npm gives the maximum field-of-view-to-resolution ratio. This value can be calculated from Equation 25 and from knowledge of the possible values of npm, which is restricted by the family chosen for the mask array. Once this value is known, the resolution ($\lambda$) becomes fixed for a given field-of-view.

By definition of m and $\alpha$, it is also known that:

$$m \cdot mp = \alpha \cdot dp \quad (27)$$

where dp is the detector pixel size (which is known because the detector is given). Since $\alpha$ is also known, this equation can be coupled with Equation 23 to obtain a system of two equations in two unknowns that can be solved for mp and m:

$$\begin{cases} m = \frac{\alpha \cdot dp \cdot npm}{FoV} + 1 \\ mp = \frac{1}{\frac{npm}{FoV} + \frac{1}{\alpha \cdot dp}} \end{cases} \quad (28a-b)$$

Thus, if one sets field of view=9 cm, dp=2.4 mm and npm=62, selecting a mask with a pixel size of 4 mm will result in a resolution $\lambda$=9 mm. Yet, by simply reducing the mask pixel size down to the smallest permissible value (which, according to the above equations results in a mask pixel size of 1.1 mm) the resolution is improved from 9 mm down to $\lambda$=1.45 mm, where the other parameters are held constant.

Note that, in addition to decreasing the mask pixel size (mp), the resolution could also be improved by increasing the number of mask pixels (npm). For instance, if npm is 74, (which is a possible value for a self-supporting MURA mask), and all other factors are equal, the resolution in the above example can be improved to 1.22 mm. However, a 74×74 self-supporting MURA cannot be made antisymmetric, thus requiring the fabrication of two masks in order to utilize the mask/negative mask artifact reduction process described above. As this example illustrates, one important limitation on the technique of increasing the number of mask pixels to improve resolution is the availability (or, rather, the lack thereof) of suitable mask patterns possessing optimal properties for near-field coded aperture imaging applications.

Further improvements to the efficacy of the near field coded aperture imaging of the present invention, and specifically improvements to the signal-to-noise ratio (SNR) of the coded aperture imaging system, can be realized by selecting an appropriate mask thickness. Generally, when designing a coded aperture mask, the mask must be made sufficiently thick in order to properly encode the projected radiation. For instance, if the imaging system is measuring $\gamma$ radiation emitted from the object of interest, the closed regions of the mask must actually be opaque to most $\gamma$ rays. Undoubtedly, there will be some transmission through the mask. However, as the amount of this transmission increases, the SNR decreases, as evident from the following expression:

$$SNR = \frac{(1-t)S_i\sqrt{N}}{\sqrt{4B + 2(1+t^2)I_t}} \quad (29)$$

with t=mask transmission; $S_i$=counts due to the reconstructed point; N=number of open mask pixels; B=counts due to uniform (unencoded) background; and $I_T$=object intensity (i.e. the sum of all $S_i$).

At the same time, any mask with finite thickness will invariably block at least some oblique rays that should pass through a mask opening. Further, as the mask thickness increases, less and less $\gamma$ rays will actually pass though, particularly in the case of near-field imaging where a substantial amount of the emitted radiation impinges on the mask at a non-zero angle. This effect is observable in the phenomenon known as "vignetting," where, as mask thickness increases, features of the projected image (starting with the small holes around the periphery of the image) begin to disappear.

These factors (i.e. excessive transmission through opaque portions and "vignetting") should be considered in selecting a suitable material for fabricating the mask. Ideally, the mask material is one having minimum thickness for a given attenuation. In the particular case of γ ray imaging, this is the material with the maximum product, $\mu \times \rho$, where $\mu$ is the attenuation coefficient at 140 keV and $\rho$ is the material's density. Suitable practical materials for mask fabrication therefore include uranium ($\mu\rho$=48.97 cm$^{-1}$), platinum (38.4 cm$^{-1}$), gold (35.9 cm$^{-1}$), tungsten (30.5 cm$^{-1}$), and lead (22.96 cm$^{-1}$).

The mask thickness can be selected to optimize the tradeoff between transmission and "vignetting" described above. An appropriate mask thickness may be selected by first defining a Figure of Merit (FoM), which in this case may be the inverse of the standard deviation of the reconstruction of a point source (so that a high value is desirable) at the center of the field of view (so that pixel border effects are consistently handled), and, through simulation, graphing the FoM as a function of mask thickness.

Another suitable Figure of Merit for the simulation is the signal-to-noise ratio (SNR) with which a point source at a given position within the field of view is reconstructed. This FoM can also be plotted as a function of mask thickness, as before.

Figure 9:
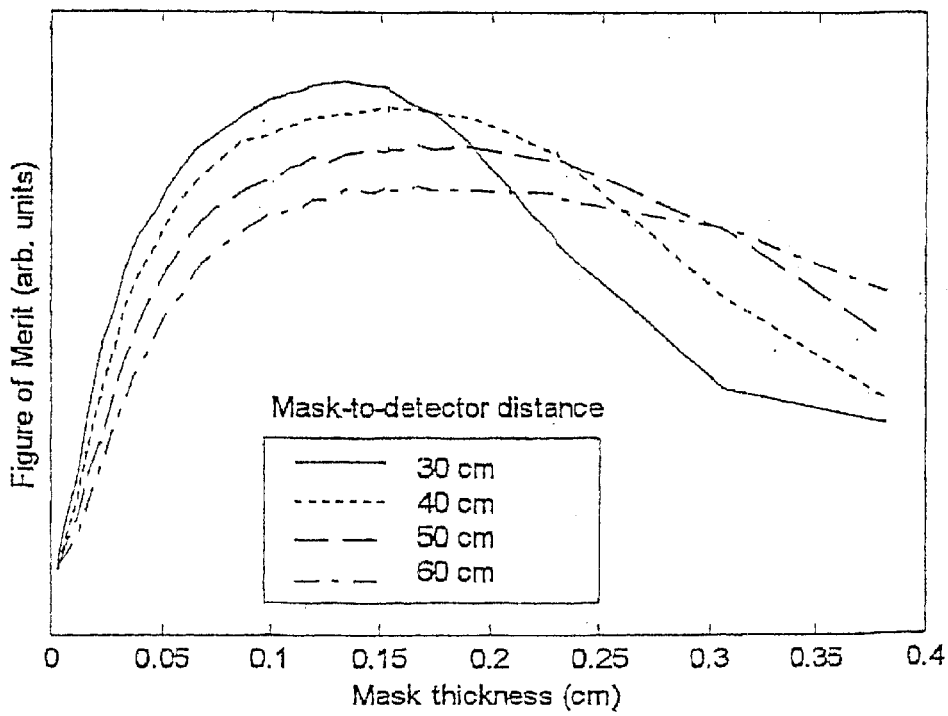
FIG. 9 is a plot of mask thickness versus a figure of merit for various mask-to-detector distances.

The object-to-detector distance, z, does have an effect on near-field artifacts, vignetting, and counting statistics, and should also be considered when selecting a suitable mask thickness for near-field coded aperture imaging applications. A graph of the FoM versus mask thickness for four values of the object-to-detector distance, z, is illustrated in FIG. 9. Choosing a low value for z improves the counting statistics, but at the expense of increased near-field artifact and vignetting effects. However, by making z too large, there may be insufficient counting statistics for an accurate image reconstruction. As shown in FIG. 9, 30, 40, 50, and 60 cm values for z, all of which may be employed for near-field imaging applications, were used for the simulation.

As illustrated in FIG. 9, for any given curve, the FoM initially increases with the mask thickness because the primary effect of increasing the thickness is to make the mask more opaque. However, as the thickness increases, vignetting effects begin to prevail, and, consequently, the FoM begins to decrease. The optimal mask thickness can be determined by finding the maximum value for a given object-to-detector distance, z. In this case, for z=40 cm, for instance, the maximum FoM is at a mask thickness of approximately 1.5 mm. This value is not much different from the predicted maximum FoM values for the other object-to-detector distances, particularly the predicted FoM value when z=30 cm.

Tungsten is a particularly well-suited material for the coded aperture mask due to the attenuation characteristics noted above, as well as its reasonable cost, availability, and relative ease of fabrication. A tungsten mask with a thickness of 1.5 mm provides 99% attenuation (1% transmission) for γ radiation at 140 keV.

As previously discussed, there are a number of coded aperture mask families which exhibit the ideal imaging properties (i.e. A $\otimes$ G=δ) for coded aperture imaging applications. Within these families, there are patterns having relatively little difference with respect to the achievable resolution and field of view. Also, the techniques for improved coded aperture imaging described above (i.e. mask/antimask, mosaicked pattern, reduction in pixel size, optimization of mask thickness, etc.), may be extended to any of these mask families.

The choice of the mask pattern does impact one important characteristic of the imaging system: the signal-to-noise (SNR) ratio. One mask parameter in particular, the open fraction of a mask, $\rho$, (defined as the ratio of the open pixels to the total number of pixels) has previously been recognized as an important factor for SNR. In the case of a point source, for instance, the SNR is proportional to the square root of the number of mask pixels, npm. Thus, it has generally been understood that the higher the open fraction of the mask, the better the SNR.

It is also known, though, that the SNR advantage of a high open fraction becomes less pronounced as the object becomes less like a point source. In other words, as the object "concentration," $\psi_i$, (defined as the ratio of the signal corresponding to the reconstructed point, $S_i$, to the total object intensity, $I_T$) decreases, the coded aperture overlaps data from the different radiation-emitting points. In the process of "undoing" this overlap between different sources, some SNR is lost.

In addition to the object concentration, $\psi_i$, the number of "overlaps" further depends on $\rho$, the open mask fraction. The higher the open mask fraction, the more superimpositions are likely to occur. Consequently, there is a tradeoff in selecting a suitable open mask fraction: choosing a high value of $\rho$ generally results in a high signal and thus improved SNR, but this also increases the superimposition of points on the detector, which undercuts or even eliminates this SNR advantage.

There is thus a theoretical optimal open fraction for maximizing the SNR for a given coded aperture imaging application. However, as there are a finite number of available mask patterns to choose from, each associated with a certain value of $\rho$, it is unlikely that the theoretical optimal open fraction can be actually realized for a given coded aperture imaging application. Nevertheless, studying the effect of the open mask fraction on SNR can aid in the process of selecting a suitable pattern with sufficiently high SNR for a particular coded aperture imaging problem. One mask family, known as Uniformly Redundant Arrays (URAs), have previously been studied with respect to optimizing the open fraction to maximize SNR. Based upon these studies, it has been generally thought that relatively low values of $\rho$, less than 0.1, provide the best realistically achievable SNR.

One aspect of the present invention is based upon the realization that the assumptions underlying the relationship between $\rho$ and SNR for URA masks do no not have general application to all mask families. On the contrary, these assumptions regarding the relationship between $\rho$ and SNR apply only to a particular subset of masks for which the mask pattern is equivalent to the decoding array, such as URAs. For other masks, empirical observations reveal that the relationship between $\rho$ and SNR is not the same as the case of URAs. For instance, out of the four candidate arrays illustrated in FIGS. 4A–4D, the 77×77 product array (FIG. 4D) has the lowest $\rho$, approximately 0.09, (which is close to the predicted optimal open fraction for URA patterns), yet exhibits far inferior SNR than the other three arrays with larger open mask fractions: the 79×79 MURA ($\rho$=0.5) (FIG. 4A), the 62×62 No-Two-Holes-Touching MURA ($\rho$=0.125) (FIG. 4C), and the 63×65 m sequence ($\rho$=0.5) (FIG. 4D).

The SNR can be generalized for all families of coded aperture masks, resulting in the expression:

$$SNR_{ij} = \frac{(1-t)N\psi_{ij}}{\sqrt{(1-t)\sum_{k,l}\psi_{kl}\sum_{u,v}A_{kl}G_{ij}^2 + (t+\xi)\sum_{u,v}G_{ij}^2}}$$

where N=the number of open holes, t=the mask transmission, ψ=the concentration parameter, A and G the mask and decoding array, respectively, and ξ=background radiation. The present invention relates in one aspect to an improved method for coded aperture imaging wherein the mask pattern is selected in accordance with the above relationship to possess optimal or near-optimal SNR for the particular coded aperture imaging application.

Figure 10A:
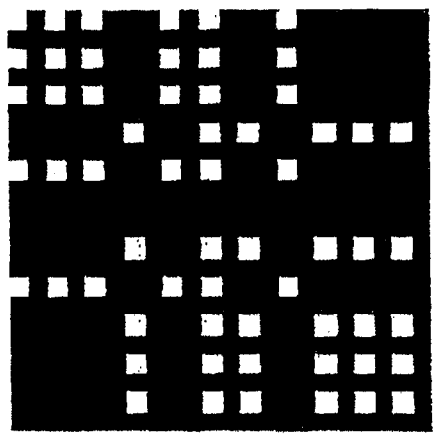
FIG. 10A is an illustration of an asymmetric 11×11 No-Two-Holes-Touching MURA coded aperture mask pattern.
Figure 10B:
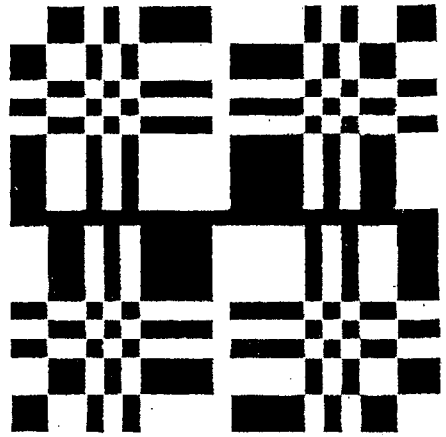
FIG. 10B is an illustration of an asymmetric 23×23 MURA coded aperture mask pattern.

One family of mask patterns possessing advantageous SNR characteristics is the MURA family. A suitable MURA mask may be fabricated by securing a foil of a high-attenuation material, such as lead, to a supporting plate of a low-attenuation material, such as aluminum. The aluminum plate is intended to serve only the mechanical function of maintaining the integrity of the mask pattern, in particular, maintaining the positions of isolated opaque pixels of the mask. The mask itself can be manufactured using conventional techniques, such as milling. The MURA pattern can ideally be made antisymmetric, so that the single mask can serve as both the mask and antimask for the purpose of near-field artifact reduction as described above. One example of an antisymmetric MURA is illustrated in FIG. 10B.

Also, a self-supporting MURA mask may be employed. A self-supporting MURA is obtained from the standard MURA pattern by inserting opaque columns and rows between all the columns and rows of the standard MURA pattern. Thus, no opaque pixel is connected to any other opaque pixel by its corner only (which can be difficult to achieve from a fabrication standpoint), and all open pixels are separated from adjacent open pixels by at least one opaque pixel (i.e. No Two Holes Touching). The self-supporting MURA is characterized by a lower open mask fraction (approximately 0.125 as opposed to 0.5 for the standard MURA), and is further characterized by a slight reduction in SNR compared to the standard MURA. However, there are certain advantages to the self-supporting mask which may outweigh this slight reduction in SNR. For one, Tungsten can be employed as the mask material. As discussed above, Tungsten permits the fabrication of a mask characterized by high-attenuation at minimal thickness. Tungsten is an impractical material for a standard MURA, because it is very difficult to fabricate a Tungsten mask using conventional milling techniques. On the other hand, with a self-supporting mask, the support plate becomes unnecessary, and alternative fabrication techniques, such as photo-etching, can be employed. Tungsten is amenable to photo-etching, a known technique which utilizes acid to cut away the open holes of the mask. As with the conventional MURA, the self-supporting MURA can ideally be fabricated as an anti-symmetric mask, as illustrated in FIG. 10A.

Other suitable materials for fabricating the mask include sintered Tungsten-based compositions (composed of greater than 90% Tungsten, for example). These materials have the additional advantage that they are more easily machinable than pure Tungsten. Suitable compositions for manufacturing coded aperture masks are commercially available under the trade names Densalloy™ and Heavimet™.

Once the mask pattern family is selected, the final parameter to consider is the size of the mask. This parameter is largely determined by factors previously discussed. For instance, assuming that the mask pattern is a self-supporting, No Two Holes Touching, mosaicked, pattern centered, antisymmetric MURA, the mask size is determined by the detector parameters. From Equation 24, the number of mask pixels should be as high as possible to optimize resolution and field of view. However, the number of mask pixels is limited by the detector array characteristics, as well as the sampling parameter, α, which is set to two.

If, for example, the detector array is 161×222 pixels, the maximum number of mask pixels is 161×161, because all MURAs are square. However, since α=2, this number is really only 80×80. Furthermore, since for self-supporting patterns every other column and row is empty, the underlying MURA pattern can be, at most, 40×40. Another characteristic of MURAs is that, for every pixel array n×n, n must be prime. Thus, the first available prime number that is less than 40 is 37, but a 37×37 mask cannot be made antisymmetric. The next highest prime number n is 31, which will give an antisymmetric mask. Using an underlying 31×31 antisymmetric MURA pattern, and factoring in the opaque rows and columns for the self-supporting mask, the final pattern is therefore 62×62.

It should be noted that a 37×37 MURA pattern may be employed (thus resulting in a 74×74 self-supporting MURA mask). This mask would exhibit improved resolution over the 62×62 mask due to the higher number of pixels. However, because this mask cannot be made antisymmetric, two masks (i.e. mask and antimask) would be needed in order to utilize the artifact reduction method of the present invention.

The coded aperture systems and methods of the present invention may be advantageously used for high-resolution high-sensitivity imaging in nuclear medicine applications. Testing has been done with 1.15 mm (ID) capillary tubes injected with ~150 μCi of $^{99m}$Tc, as well as 2d thyroid phantoms injected with ~200 μCi $^{99m}$Tc with the phantom at a distance of 40 cm from the detector. In the thyroid study, the two exposures (i.e. mask/negative mask) took approximately 8 minutes each. The results were in agreement with prediction as regards to near-field artifact reduction. The measured resolution was approximately 1.5 mm.

In vivo studies have also been performed on mice injected with ~100 μCi and ~300 μCi of a bone agent, $^{99m}$Tc MDP, and similar tests have been done with a blood agent, $^{99m}$Tc MPEG-PL. In these cases, high-resolution artifact-free images were obtained with improved SNR relative to the available technology, including collimators. In these studies, it has further been confirmed that the largest SNR advantages are realized when the object concentration, ψ, is relatively large. The SNR can be increased, for instance, when a lead block is inserted to shield selected portions of the field of view, thus producing a high ψ object of interest, and a much-improved reconstructed image. The present coded aperture imaging systems and methods may be particularly beneficial for imaging small, "useful" fields of view.

Satisfactory results have also been achieved using higher energy (i.e.>140 keV) isotopes. Although, in the case of a high-energy (511 keV) $^{18}$F isotope, achieving the same SNR with previously-described 62×62 MURA mask requires an exposure time approximately 50 times longer than the case of the lower-energy (140 keV) $^{99m}$Tc isotope.

New mask designs may be required to optimize performance for higher energy isotopes. For high-energy isotopes, a thicker mask with larger holes can be employed to achieve SNR performance equivalent to the lower-energy isotope examples using the previously-described mask, but at the cost of a worse resolution (e.g. 1.11 mm to 3 mm). It is expected that the present invention can be extended for use with medium energy (e.g. $^{111}$In, $^{67}$Ga), as well as high energy (e.g. $^{131}$I, $^{18}$F, other PETs) isotopes.

It is further expected that the coded aperture imaging according to the principles of the present invention will also prove advantageous for three-dimensional imaging applications, such as computer-aided tomography, or single photon emission computed tomography (SPECT).

The coded aperture imaging system of the present invention can be used to obtain information about the depth of the imaged structures using a technique that is analogous to conventional x-ray laminography. According to this aspect, the coded aperture camera is able to image individual two-dimensional planes, or "slices", of the three-dimensional object. By consecutively imaging the individual slices making up the object, information regarding the object in all three dimensions may be obtained.

Classical x-ray laminography techniques are based on the relative motion of the x-ray source, the object to be imaged, and the detector. The x-ray source and the detector are moved synchronously (translationally or rotationally) in opposite directions. Because of this correlated motion, the location of the projected images of points within the object also moves. Only points from a particular slice of the object, the focal slice, will be projected always at the same location on the detector. Object structures above and below the focal slice will project at constantly changing points due to the relative motion of the source, object and detector. Consequently, the focal slice will be imaged sharply, while points outside of this slice will be superimposed as background intensity to the focal slice. Additional slices of the object can be imaged by displacing the object (either towards or away from the detector), and repeating the imaging process.

Figure 11:
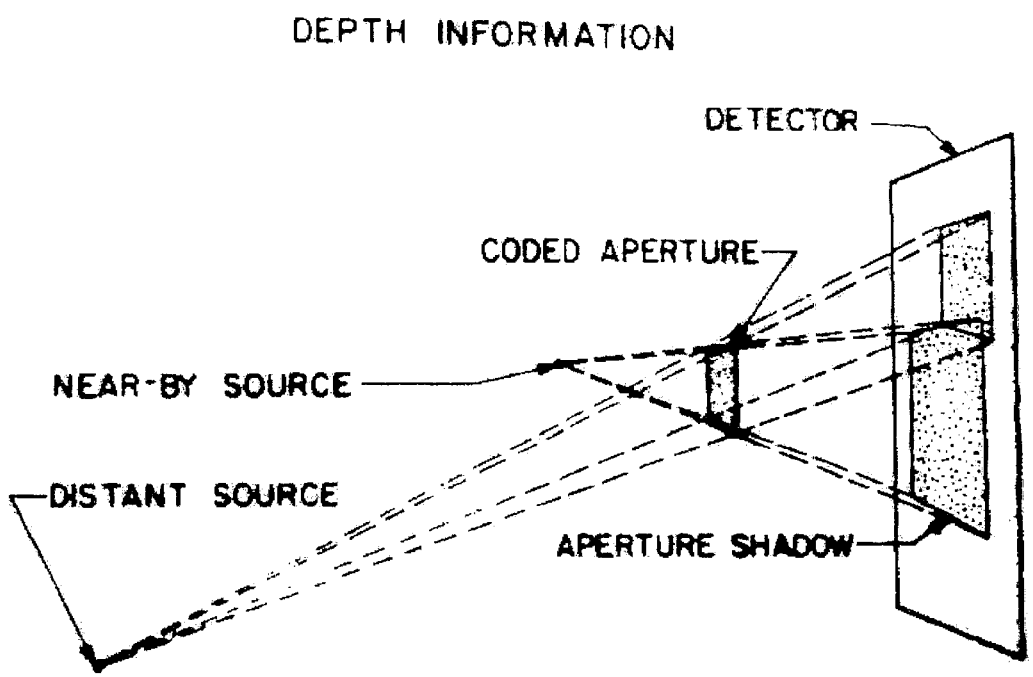
FIG. 11 is a perspective side view of two point sources in a three-dimensional space projecting coded aperture mask patterns of different sizes onto a detector.

In the context of the present invention, a method for laminograpy does not rely on any motion of the object, aperture mask or detector. Instead, the present invention utilizes the fact that point sources at different distances from the mask project mask patterns of different sizes onto the detector, where the size of the projected mask pattern is a unique function of the distance of the point from the detector. This is illustrated in FIG. 11, which shows two point sources in a three-dimensional space, each of which is a different distance from the mask and detector, projecting coded aperture mask patterns of different sizes onto the detector. After acquiring data from a three-dimensional object, one can scale the decoding pattern to match any size, and thus decode the data corresponding to any depth in the object. The decoding process will produce a sharp and artifact-free image of only the plane at the distance for which the decoding pattern is scaled. Point sources on other planes will be decoded incorrectly, and should blur into the uniform background.

Moreover, as one can decode the same data after scaling the decoding pattern to another size, one can produce, from a single data set, images from different depths of the object. No object motion is required.

Alternatively, the decoding pattern can be scaled to decode at a single depth only, and the object can be moved closer and farther from the detector to decode different focal slices of the three-dimensional object.

In addition to the nuclear medicine applications described above, the coded aperture imaging of the present invention may also be employed for the detection and imaging of radiation resulting from nuclear interrogation of a target object. For instance, coded aperture imaging may be useful for the detection of contraband (e.g. explosives, drugs, and alcohol) concealed within cargo containers, suitcases, parcels, or other objects. Exemplary methods and apparatus for coded aperture imaging which employ nuclear interrogation of a target object are disclosed in U.S. Pat. No. 6,205,195, "Coded Aperture Imaging," by Richard C. Lanza, the entire contents of which are incorporated herein by reference.

In addition to nuclear medicine imaging and contraband detection, the principles of the present invention may prove useful for numerous additional coded aperture imaging applications, including materials analysis, scatter radiation imaging, and applications relating to detecting the movement or flow of radiation-emitting materials over time.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of imaging radiation using coded apertures comprising:

generating a first signal at a detector as a result of near-field radiation from an object being projected through a first coded aperture mask pattern; the object and the first coded aperture mask pattern configured such that the image of the object projected through the first coded aperture mask pattern is the convolution of the coded aperture mask pattern with the object that is modulated by a $\cos^3(\theta)$ term, where $\cos^3(\theta)$ is not approximately equal to one;

generating a second signal at the detector as a result of near-field radiation from the object being projected through a second coded aperture mask pattern, where the second coded aperture mask pattern is associated with a decoding array that is the negative of a decoding array associated with the first coded aperture mask pattern; and combining the first and second signals to obtain a reconstructed image of the object that is substantially free of near-field artifacts that would visibly corrupt the reconstructed image if the reconstructed image were obtained solely from the first signal.

2. The method of claim 1 wherein the object is located less than about 10 meters from the detector.

3. The method of claim 1 wherein the projected radiation is in the form of x-rays or gamma rays.

4. The method of claim 1 wherein the projected radiation is in the form of infrared radiation.

5. The method of claim 1 further comprising interrogating the object with an energy source to produce the projected radiation.

6. The method of claim 1 wherein the object is anatomical.

7. The method of claim 6 further comprising evaluating the reconstructed image to determine the presence of tumors.

8. The method of claim 6 wherein the object contains a radioactive material.

9. The method of claim 1 further comprising evaluating the reconstructed image to determine the existence of contraband articles.

10. The method of claim 1 further comprising:

after radiation from the object is projected through the first coded aperture mask pattern, replacing a first coded aperture mask with a second coded aperture mask.

11. The method of claim 1 wherein a single coded aperture mask comprises both the first coded aperture mask pattern and the second coded aperture mask pattern.

12. The method of claim 11 further comprising:
after radiation from the object is projected through the first coded aperture mask pattern, rotating the coded aperture mask by a pre-determined angle to provide the second mask pattern.

13. The method of claim 12 wherein the pre-determined angle is 90 degrees.

14. The method of claim 1 wherein radiation from the object is projected through the first coded aperture mask pattern and radiation from the object is projected through the second coded aperture mask pattern for approximately equal time durations.

15. The method of claim 1 further comprising positioning the first coded aperture mask pattern and detector and/or the object such that the center of mass of the object is at about the center of the field of view of the mask and detector.

16. The method of claim 1 wherein the generated signals are processed using a decoding function associated with each coded aperture mask pattern.

17. The method of claim 16 wherein the decoding function is scaled to obtain a reconstructed image of a two-dimensional slice of a three dimensional object.

18. The method of claim 1 wherein the generated signals from the first and second projections are added to cancel near-field artifacts that would otherwise appear in the reconstructed image.

19. The method of claim 1 wherein processing data from the projections includes dividing the data by a pre-factor to correct for zero-order artifacts.

20. The method of claim 1 further comprising:
while obtaining an image projected through a the coded aperture mask patterns changing the position of the object relative to the coded aperture mask and the detector to obtain an image of a cross-sectional slice of a three-dimensional object.

21. The method of claim 1 wherein the coded aperture mask patterns are mosaicked.

22. An apparatus for imaging an object emitting near-field radiation comprising:
a detector array for detecting at least one of the energy or position of radiation emitted by the object and generating a signal in response thereto;
at least one coded aperture mask, including a first mask pattern and a second mask pattern, disposed between the detector and the object, such that a first portion of the radiation is detected by the detector array after passage through the first mask pattern, and a second portion of the radiation is detected by the detector array after passage through the second mask pattern, where the second mask pattern is associated with a decoding array that is the negative of a decoding array associated with the first mask pattern; the object and the mask patterns being configured such that radiation emitted by the object and projected through a the first mask pattern produces an image that is the convolution of the first mask pattern with the object that is modulated by a $\cos^3(\theta)$ term, where $\cos^3(\theta)$ is not approximately equal to one; and
a data processor for processing signals, the signals generated in response to radiation passed through the first mask pattern and radiation passed through the second pattern, to produce a reconstructed image of the object that is substantially free of near-field artifacts that would visibly corrupt the reconstructed image if the reconstructed image were obtained solely from the signal generated in response to radiation passed through the first mask pattern.

23. The apparatus of claim 22 wherein the detector array receives radiation from an object that is less than about 10 meters from the detector array.

24. The apparatus of claim 22 further comprising display means for displaying a visible image of the object.

25. The apparatus of claim 22 wherein the emitted radiation is in the form of x-rays or gamma rays.

26. The apparatus of claim 22 wherein the emitted radiation is in the form of infrared radiation.

27. The apparatus of claim 22 wherein the at least one coded aperture mask comprises the first coded aperture mask having a first mask pattern and a second coded aperture mask having a second mask pattern.

28. The apparatus of claim 27 additionally comprising means for interchanging the position of the first and second masks.

29. The apparatus of claim 22 wherein a single coded aperture mask comprises the first mask pattern and the second mask pattern.

30. The apparatus of claim 29 additionally comprising means for rotating mask having the first mask pattern by a pre-determined angle to provide the second mask pattern.

31. The apparatus of claim 22 further comprising means for changing the position of the object relative to the at least one coded aperture mask and the detector to obtain an image of a cross-sectional slice of a three-dimensional object.

32. The apparatus of claim 22 wherein the mask patterns are mosaicked.

* * * * *